(12) United States Patent
Lim et al.

(10) Patent No.: US 10,348,460 B2
(45) Date of Patent: Jul. 9, 2019

(54) METHOD FOR TRANSMITTING FRAME IN WIRELESS LAN SYSTEM

(71) Applicant: LG ELECTRONICS INC., Seoul (KR)

(72) Inventors: Dongguk Lim, Seoul (KR); Jinyoung Chun, Seoul (KR); Wookbong Lee, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 15/525,014

(22) PCT Filed: Aug. 4, 2015

(86) PCT No.: PCT/KR2015/008143
§ 371 (c)(1),
(2) Date: May 5, 2017

(87) PCT Pub. No.: WO2016/076511
PCT Pub. Date: May 19, 2016

(65) Prior Publication Data
US 2017/0338919 A1    Nov. 23, 2017

Related U.S. Application Data

(60) Provisional application No. 62/080,390, filed on Nov. 16, 2014.

(51) Int. Cl.
*H04L 5/00* (2006.01)
*H04B 7/0452* (2017.01)
(Continued)

(52) U.S. Cl.
CPC ......... *H04L 5/0007* (2013.01); *H04B 7/0452* (2013.01); *H04L 5/0023* (2013.01);
(Continued)

(58) Field of Classification Search
None
See application file for complete search history.

(56) References Cited

U.S. PATENT DOCUMENTS 8,462,863 B1   6/2013  Zhang et al.
2009/0207894 A1*  8/2009  Nefedov ............ H04W 56/002
                                                     375/219

(Continued)

FOREIGN PATENT DOCUMENTS

WO    2013077651    5/2013
WO    2014171788    10/2014
WO    2014182065    11/2014

OTHER PUBLICATIONS

PCT International Application No. PCT/KR2015/008143, Written Opinion of the International Searching Authority dated Nov. 24, 2015, 20 pages.

*Primary Examiner* — Donald L Mills
(74) *Attorney, Agent, or Firm* — Lee Hong Degerman Kang Waimey

(57) ABSTRACT

Disclosed is a method for transmitting, by a first station, a frame in a wireless LAN system, and a station device therefor. To this end, a station generates a radio frame for a second type station comprising a frame portion for a first type station and a frame portion for the second type station, wherein the frame portion for the second type station comprises a signal field, a short training field (STF), a long training field (LTF), and a data field, the LTF having a symbol duration that is two or four times longer than the symbol duration of the frame portion for the first type station, and the signal field comprising information about the symbol duration of the LTF for the second type station.

11 Claims, 12 Drawing Sheets

(51) Int. Cl.
*H04L 27/26* (2006.01)
*H04W 84/12* (2009.01)
*H04W 88/08* (2009.01)
*H04B 7/0413* (2017.01)

(52) U.S. Cl.
CPC .......... *H04L 5/0048* (2013.01); *H04L 5/0092* (2013.01); *H04L 27/2602* (2013.01); *H04L 27/2605* (2013.01); *H04L 27/2613* (2013.01); *H04L 27/2626* (2013.01); *H04B 7/0413* (2013.01); *H04W 84/12* (2013.01); *H04W 88/08* (2013.01)

(56) References Cited

U.S. PATENT DOCUMENTS

| | | | |
|---|---|---|---|
| 2014/0307612 A1 | 10/2014 | Vermani et al. | |
| 2015/0334708 A1* | 11/2015 | Lee | H04L 1/00 370/329 |
| 2016/0080043 A1* | 3/2016 | Tian | H04B 7/022 375/267 |
| 2017/0170933 A1* | 6/2017 | Zhang | H04L 1/02 |

\* cited by examiner

Fig. 6

| L-STF | L-LTF | L-SIG | HE-SIG A | | | | |
|-------|-------|-------|----------|---|---|---|---|
| L-STF | L-LTF | L-SIG | HE-SIG A | HE-STF | HE-LTF | HE-SIG B | Data |
| L-STF | L-LTF | L-SIG | HE-SIG A | | | | |
| L-STF | L-LTF | L-SIG | HE-SIG A | | | | |

Fig. 7

| L-STF | L-LTF | L-SIG | HE-SIG A | | | | |
|-------|-------|-------|----------|---|---|---|---|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

Fig. 8

| L - STF | L - LTF | L - SIG | HE-SIG A | HE-SIG B | HE-STF | HE-LTF | Data for STA1 |
|---|---|---|---|---|---|---|---|
| L - STF | L - LTF | L - SIG | HE-SIG A | | HE-STF | HE-LTF | Data for STA2 |
| L - STF | L - LTF | L - SIG | HE-SIG A | | HE-STF | HE-LTF | Data for STA3 |
| L - STF | L - LTF | L - SIG | HE-SIG A | | HE-STF | HE-LTF | Data for STA4 |

METHOD FOR TRANSMITTING FRAME IN WIRELESS LAN SYSTEM

CROSS-REFERENCE TO RELATED APPLICATIONS

This application is the National Stage filing under 35 U.S.C. 371 of International Application No. PCT/KR2015/008143, filed on Aug. 4, 2015, which claims the benefit of U.S. Provisional Application No. 62/080,390, filed on Nov. 16, 2014, the contents of which are all hereby incorporated by reference herein in their entirety.

TECHNICAL FIELD

The present invention relates to a wireless communication system, and more particularly, to a method for transmitting a frame in a high-density wireless local area network (WLAN) system and station device for performing the same

BACKGROUND ART

First of all, a wireless local area network (WLAN) system is described as an example of the system to which the present invention can be applied.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

In the above-mentioned IEEE 802.11ax standards, a new frame structure is under discussion to implement high-speed wireless communication in a high-density wireless environment.

In particular, since in the new frame structure, a frame portion for a legacy terminal coexists with a frame portion for a terminal supporting IEEE 802.11ax, additional discussion on how to configure and transmit a preamble for the IEEE 802.11ax terminal is required.

Technical Solutions

In an aspect of the present invention, provided herein is a method for transmitting a frame by a first station in a wireless local area network (WLAN) system, including: generating a radio frame for a second type of station including a frame portion for a first type of station and a frame portion for the second type of station; and, wherein the frame portion for the second type of station may include a signal field for the second type of station, a short training field (STF) for the second type of station, a long training field (LTF) for the second type of station, and a data field, wherein the LTF for the second type of station may have a symbol duration longer by two or four times than a symbol duration of the frame portion for the first type of station, and wherein the signal field for the second type of station may include information on the symbol duration of the LTF for the second type of station, transmitting the generated radio frame for the second type of station to a second station.

In this case, when the generated radio frame for the second type of station is transmitted using an orthogonal frequency divisional access (OFDMA) scheme, the LTF for the second type of station may be transmitted using a P-matrix based transmission scheme.

According to the P-matrix based transmission scheme, an LTF sequence determined based on a transmission bandwidth may be transmitted after being multiplied by a P-matrix and the P-matrix may be one of the following matrices:

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

$$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}, \text{ and}$$

$$P_{8*8} = \begin{bmatrix} P_{4s4} & P_{4s4} \\ P_{4s4} & -P_{4s4} \end{bmatrix}, \text{ where}$$

$$w = \exp(-j2\pi/6).$$

Meanwhile, when the symbol duration of the LTF for the second type of station is double of the symbol duration of the frame portion for the first type of station, the LTF for the second type of station may be generated by mapping an LTF sequence at an interval of two tones in a frequency domain.

On the other hand, when the generated radio frame for the second type of station is transmitted using an uplink multi-user multi-input multi-output (UL MU-MIMO) scheme, the LTF for the second type of station may be transmitted using a tone interleaving scheme.

According to the tone interleaving scheme, LTF sequences for individual users or streams may be transmitted such that the LTF sequences are mapped to different tone locations within a single symbol and an LTF sequence for the same user or stream may be transmitted such that the LTF sequence is mapped at a predetermined tone interval.

Preferably, the signal field for the second type of station may include information regarding a scheme of mapping the LTF sequences for the individual users or streams.

In this case, the first station may be an access point (AP) or a non-AP station.

In another aspect of the present invention, provided herein is a station device operating as a first station in a wireless local area network (WLAN) system, including: a processor configured to generate a radio frame for a second type of station including a frame portion for a first type of station and a frame portion for the second type of station; and a transmitter configured to transmit the radio frame for the second type of station generated by the processor, wherein the frame portion for the second type of station may include a signal field for the second type of station, a short training field (STF) for the second type of station, a long training field (LTF) for the second type of station, and a data field, wherein the LTF for the second type of station may have a symbol duration longer by two or four times than a symbol duration of the frame portion for the first type of station, and wherein the signal field for the second type of station may include information on the symbol duration of the LTF for the second type of station.

Advantageous Effects

According to the present invention, it is possible to operate a frame that not only allows high-efficiency wireless communication but also minimize effects on the existing standard technology.

Specifically, a long training field (LTF) of a preamble part in accordance with the newly defined WLAN standards can be transmitted efficiently, thereby improving system performance.

DESCRIPTION OF DRAWINGS

FIG. 6 is a diagram for explaining details of a radio frame proposed in the present invention.

FIGS. 7 and 8 illustrate other PPDU formats.

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
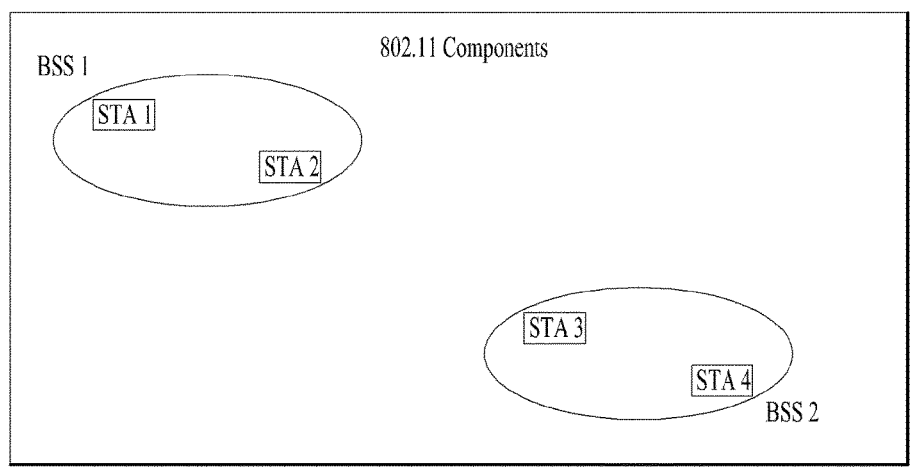
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
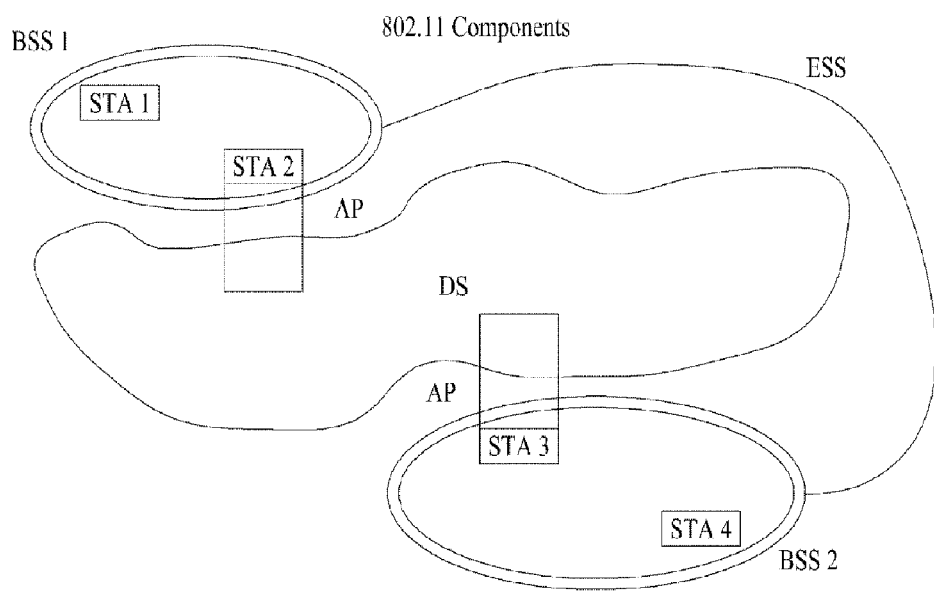
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above discussion, a frame structure that can be used in the WLAN system will be described.

Figure 3:
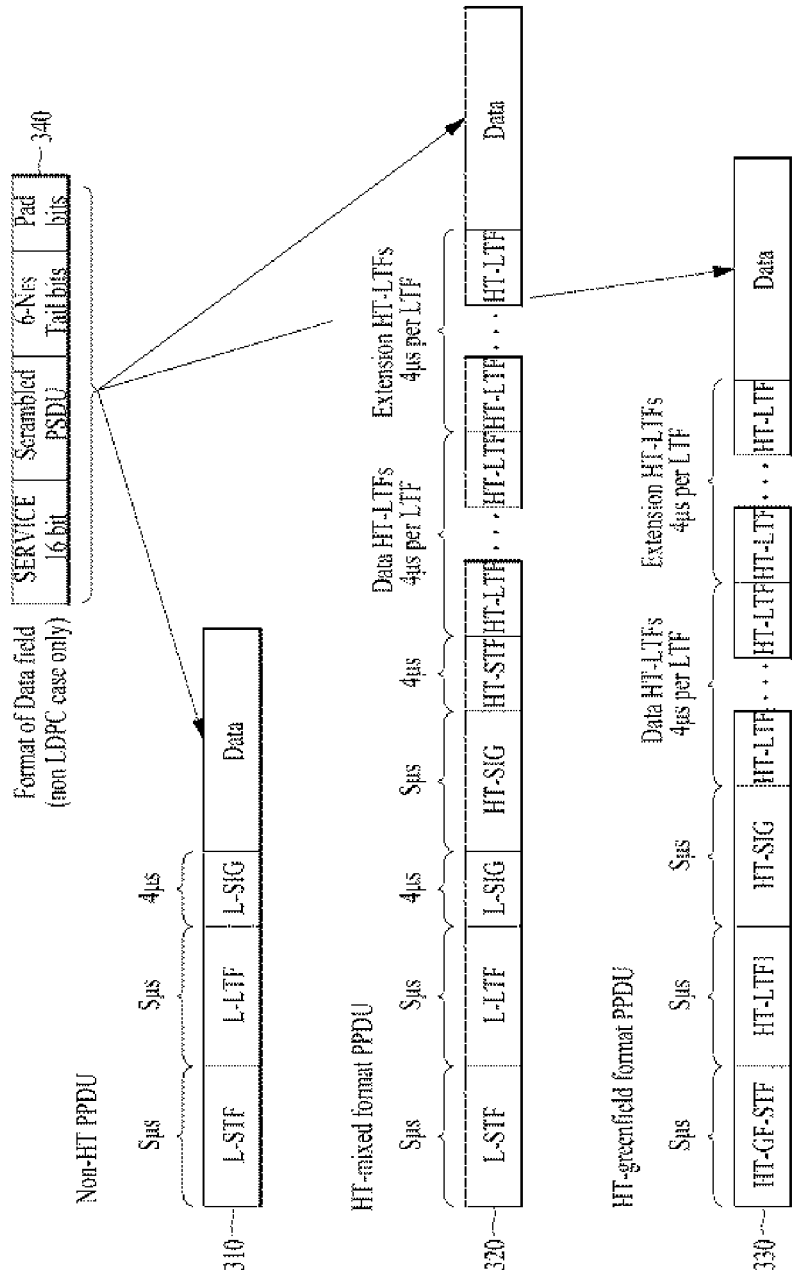
FIG. 3 is a diagram for explaining a frame structure that can be used in a WLAN system.

FIG. 3 is a diagram for explaining the frame structure that can be used in the WLAN system.

Specifically, in FIG. 3, reference numeral 310 denotes a physical layer protocol data unit (PPDU) format for a terminal in accordance with IEEE 802.11a/g standards and reference numerals 320 and 330 denote PPDU formats for a terminal in accordance with IEEE 802.11n standards. As shown in FIG. 3, a terminal supporting IEEE 802.11n schemes uses frames denoted by a prefix of "HT-".

More specifically, the reference numeral 320 denotes an HT-mixed format PPDU of the IEEE 802.11n terminal and the reference numeral 330 denotes an HT-greenfield format PPDU of the IEEE 802.11n terminal.

In addition, reference numeral 340 denotes a configuration of data in each PPDU and a physical service data unit (PSDU) is included in a data region.

Figure 4:
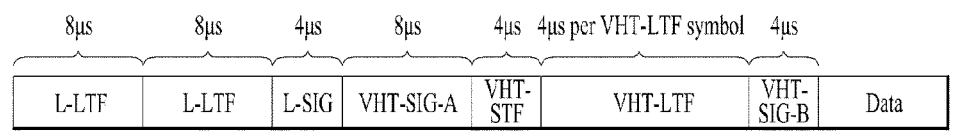
FIG. 4 illustrates a frame format according to an IEEE 802.11ac standard technology.

FIG. 4 illustrates the frame format according to the IEEE 802.11ac standard technology.

As shown in FIG. 4, a terminal in accordance with IEEE 802.11ac standards supports fields denoted by a prefix of "VHT-".

Details of individual fields illustrated in FIG. 4 are summarized in Table 1 below.

TABLE 1

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| YHT-SIG-B | VHT Signal B field |
| Data | The Data field carries the PSDU(s) |

Figure 5:
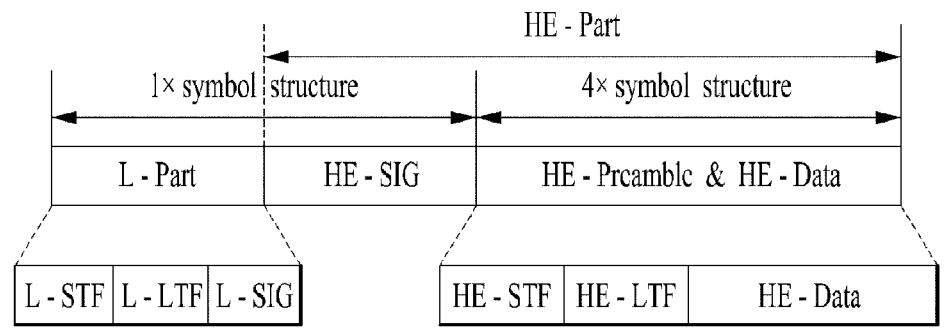
FIG. 5 is a diagram illustrating a frame format in accordance with a new standard as an embodiment of the present invention.

FIG. 5 is a diagram illustrating a frame format available in a new standards as an embodiment of the present invention.

In FIG. 5, "L-Part" indicates a frame portion for a legacy terminal (i.e., a frame portion for a first type of terminal), and "HE-Part" indicates a frame portion for a terminal in accordance with an enhanced standard technology (e.g., IEEE 802.11ax) (i.e., a frame portion for a second type of terminal). In this case, it is preferred that the frame portion in accordance with the new standards has a length greater by an integer multiple than that of the frame portion for the legacy terminal in a time domain. FIG. 5 shows an example of the frame structure in the 802.11ax where a conventional 1× symbol structure (i.e., 3.2 us) is maintained until an HE-SIG, whereas a 4× symbol structure (i.e., 12.8 us) is used for an HE-preamble and data.

In the case of the "L-Part" in the example of FIG. 5, an L-STF, L-LTF, and L-SIG can be maintained similar to a configuration of the conventional Wi-Fi system as illustrated in FIG. 3 and FIG. 4.

The newly defined HE-SIG in the HE-Part may have fields for indicating common control information and user-specific information. As illustrated in FIG. 5, the 1× symbol structure is used in the HE-SIG similar to the L-Part. On the other hand, since the 4× symbol structure is used in the HE-preamble and data, a frequency tone (FT) that can be used per bandwidth is increased by four times compared to the conventional Wi-Fi system. In addition, the number of available tones may also be changed. Therefore, the HE-preamble (HE-STF and HE-LTF) can be newly designed to support the increased FT and the changed available tones.

While the present invention has been described with reference to examples in which an HE-STF, an HE-LTF, and a data field are transmitted based on the 4× structure, a symbol duration length may be differently configured in each field. It will be described in detail in the following.

FIG. 6 is a diagram for explaining details of a radio frame proposed in the present invention.

The PPDU can be transmitted through four 20 MHz channels, i.e., over an 80 MHz bandwidth. In addition, the PPDU can be transmitted in each of the 20 MHz channels. Although FIG. 5 shows an example in which the 80 MHz bandwidth is allocated to a single STA, the four channels may be allocated to different STAs.

Each of the L-STF, L-LTF, and L-SIG may be transmitted in an OFDM symbol where 64 FFT points are used in each 20 MHz channel.

An HE-SIG A may be used to transmit common control information to STAs that receive the PPDU and it may be transmitted through 2 or 3 OFDM symbols. Table 2 shows exemplary contents of the HE-SIG A.

TABLE 2

| Field | Bit | Description |
|---|---|---|
| Bandwidth | 2 | Indicating a bandwidth in which a PPDU is transmitted. For example, 20 MHz, 40 MHz, 80 MHz or 160 MHz |
| Group ID | 6 | Indicating an STA or a group of STAs that will receive a PPDU |
| Stream information | 12 | Indicating the number or location of spatial streams for each STA, or the number or location of spatial streams for a group of STAs |
| UL indicator | 1 | Indicating whether a PPDU is destined to an AP (uplink) or to an STA (downlink) |
| MU indicator | 1 | Indicating whether a PPDU is an SU-MIMO PPDU or an MU-MIMO PPDU |
| GI indicator | 1 | Indicating whether a short GI or a long GI is used |
| Allocation information | 12 | Indicating a band or a channel (subchannel index or subband index) allocated to each STA in a bandwidth in which a PPDU is transmitted |
| Transmission power | 12 | Indicating a transmission power for each channel or each STA |

The HE-STF may be transmitted to improve performance of AGC estimation in HE-PPDU transmission and the HE-LTF may be used to estimate a packet transmission channel.

An HE-SIG B may include user-specific information necessary for each STA to receive its data (i.e., a physical layer service data unit (PSDU)). The HE-SIG B may be transmitted through 1 or 2 OFDM symbols. For example, the HE-SIG B may include information on a length of a corresponding PSDU and an MCS level of the corresponding PSDU.

Each of the L-STF, L-LTF, L-SIG, and HE-SIG A may be repeatedly transmitted in a unit of 20 MHz channel. For example, when the PPDU is transmitted through four 20 MHz channels, each of the L-STF, L-LTF, L-SIG, and HE-SIG A may be repeatedly transmitted in the 20 MHz channel.

An FFT size per unit frequency may be increased from the HE-STF (or from the HE-SIG A). For example, a 256 FFT size may be used in a 20 MHz channel, a 512 FFT size may be used in a 40 MHz channel, and a 1024 FFT size may be used in an 80 MHz channel. If an FFT size is increased, the number of OFDM subcarriers per unit frequency is increased because a spacing between OFDM subcarriers is reduced. However, an OFDM symbol time (symbol duration) may be increased. To improve efficiency, a (GI) after the HE-STF may be configured to be the same as that after the HE-SIG A.

FIGS. 7 and 8 illustrate other PPDU formats.

The PPDU format shown in FIG. 7 is identical to that in FIG. 6 except that the HE-SIG B is placed immediately after the HE-SIG A. In this case, the FFT size may be increased after the HE-STF (or the HE-SIG B).

FIG. 8 is partially identical to FIG. 7 in that the HE-SIG B is placed immediately after the HE-SIG A. However, referring to FIG. 8, 20 MHz channels are allocated to different STAs (e.g., STA1, STA2, STA3, and STA4). Although the HE-SIG B includes information necessary for each STA, the HE-SIG B is encoded over an entire band. That is, the HE-SIG B may be received by all the STAs. The HE-SIG B shown in FIGS. 7 and 8 is merely an example and it may be separately encoded in each 20 MHz channel for transmission. Moreover, the FFT size per unit frequency may be increased after the HE-STF (or the HE-SIG B).

If the FFT size is increased, legacy STAs that support IEEE 802.11a/g/n/ac cannot decode a corresponding PPDU. For coexistence between the legacy STAs and HE-STAs, each of the L-STF, L-LTF, and L-SIG is transmitted through the 20 MHz channel using 64 FFT. For instance, the L-SIG may be transmitted in a single OFDM symbol. In this case, one OFDM symbol duration may be 4 us and a GI may be 0.8 us.

The HE-SIG A may include information necessary for the HE STA to decode an HE PPDU. However, the HE-SIG A may be transmitted through the 20 MHz channel using 64 FFT so that it can be received by both of the legacy STA and the HE STA. This is because to allow the HE STA to receive not only the HE PPDU but also HT/VHT PPDUs. In this case, it is preferred to allow the legacy STA and the HE STA to distinguish the HE PPDU from the HT/VHT PPDU.

Figure 9:
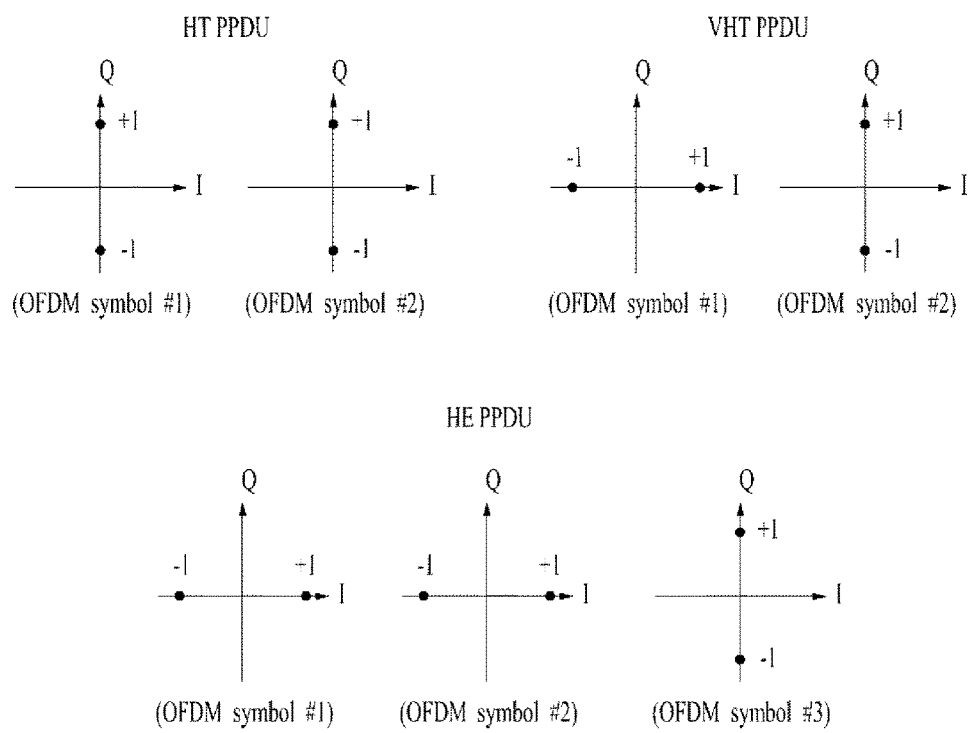
FIG. 9 is a diagram for explaining a phase rotation performed to distinguish between PPDUs.

FIG. 9 is a diagram for explaining a phase rotation performed to distinguish between PPDUs. To distinguish between PPDUs, phase constellations can be used for transmission of an OFDM symbol after the L-STF, L-LTF, and L-SIG as shown in FIG. 9.

To distinguish between the HT/VHT PPDUs, phases of three OFDM symbols, which are transmitted after the L-SIG in the HE-PPDU, can be used. Phases of OFDM symbol #1 and OFDM symbol #2 are not rotated whereas a phase of OFDM symbol #3 may be rotated by 90 degrees counter-clockwise. BPSK modulation may be applied to the OFDM symbols #1 and #2 and QPSK modulation may be applied to the OFDM symbol #3. If the HE-SIG A is transmitted through three OFDM symbols appearing after the HE-SIG, it could be interpreted as that the three OFDM symbols are used to transmit the HE-SIG A.

Based on the above discussion, a description will be given of a method of transmitting an HE-LTF.

Figure 10:
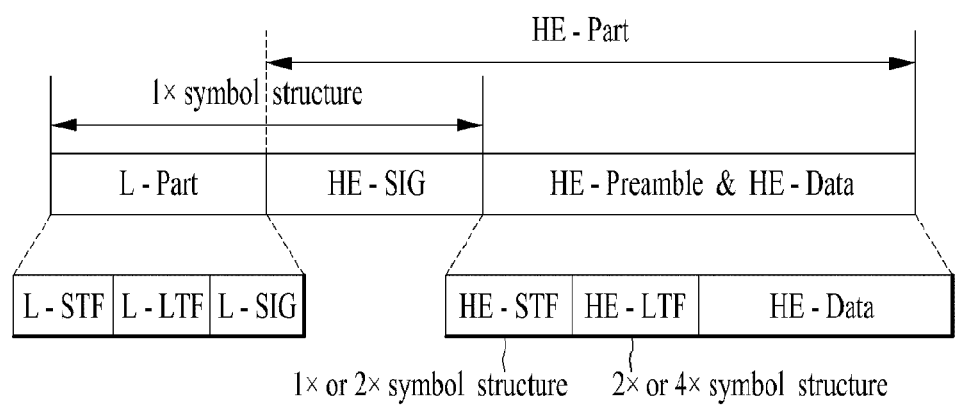
FIG. 10 is a diagram for explaining a radio frame structure according to a preferred embodiment of the present invention.

FIG. 10 is a diagram for explaining a radio frame structure according to a preferred embodiment of the present invention.

Unlike FIG. 5, where a 4× symbol structure is used for an HE-preamble part, FIG. 10 shows a scheme in which different symbol structures are used for an HE-STF and an HE-LTF. Specifically, either a 1× symbol structure or a 2× symbol structure may be selectively used for the HE-STF and either a 2× symbol structure or a 4× symbol structure may be selectively used for the HE-LTF. When the HE-LTF has the 4× symbol structure, an HE-LTF sequence may be generated by filling all tones in the frequency domain. On the other hand, in the case of the 2× symbol structure, the HE-LTF sequence may be generated such that its components are mapped at an interval of two tones in the frequency domain. When the HE-LTF sequence is generated by mapping them at the two-tone interval in the frequency domain, it may create repeated waveforms in the time domain. In addition, it is advantageous in that a receiving end can operate by decoding only a single waveform among the repeated waveforms.

When the symbol structure is selectively used for the HE-STF and the HE-LTF, it is preferred to notify an STA of related information through the HE-SIG field.

Meanwhile, the 11ax supports OFDMA and UL-MU MIMO to improve data transmission efficiency in the above-described Nx symbol structure. Therefore, it is possible to consider a scheme of using an HE-LTF based on the conventional P-matrix and a scheme of using a tone-interleaved HE-LTF to estimate a channel for data transmitted using the OFDMA and the UL-MU MIMO in the Nx symbol structure.

Hereinafter, each scheme will be described in detail.

P-Matrix Based Scheme

Similar to a VHT-LTF used in the 11ac, a sequence for the LTF is determined based on a bandwidth. The sequence determined for each bandwidth is multiplied by the P-matrix and then transmitted for distinguishment between LTFs of multi-user/multi-stream and channel estimation.

That is, each user/stream can identify an LTF for the corresponding user/stream using the same LTF sequence through the P-matrix. In this case, a size of the P-matrix, which the LTF sequence is multiplied by, is determined by the number of users/streams for transmission as follows.

Equation 1

$$P_{VHTLTF} = \begin{cases} P_{4\times 4'} N_{STS,total} \leq 4 \\ P_{6\times 6'} N_{STS,total} = 5, 6 \\ P_{8\times 8'} N_{STS,total} = 7, 8 \end{cases}$$ [Equation 1]

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

$$P_{8*8} = \begin{bmatrix} P_{4s4} & P_{4s4} \\ P_{4s4} & -P_{4s4} \end{bmatrix}$$

In Equation 1, $W = \exp(-j2\pi/6)$.

Tone Interleaving Scheme

Figure 11:
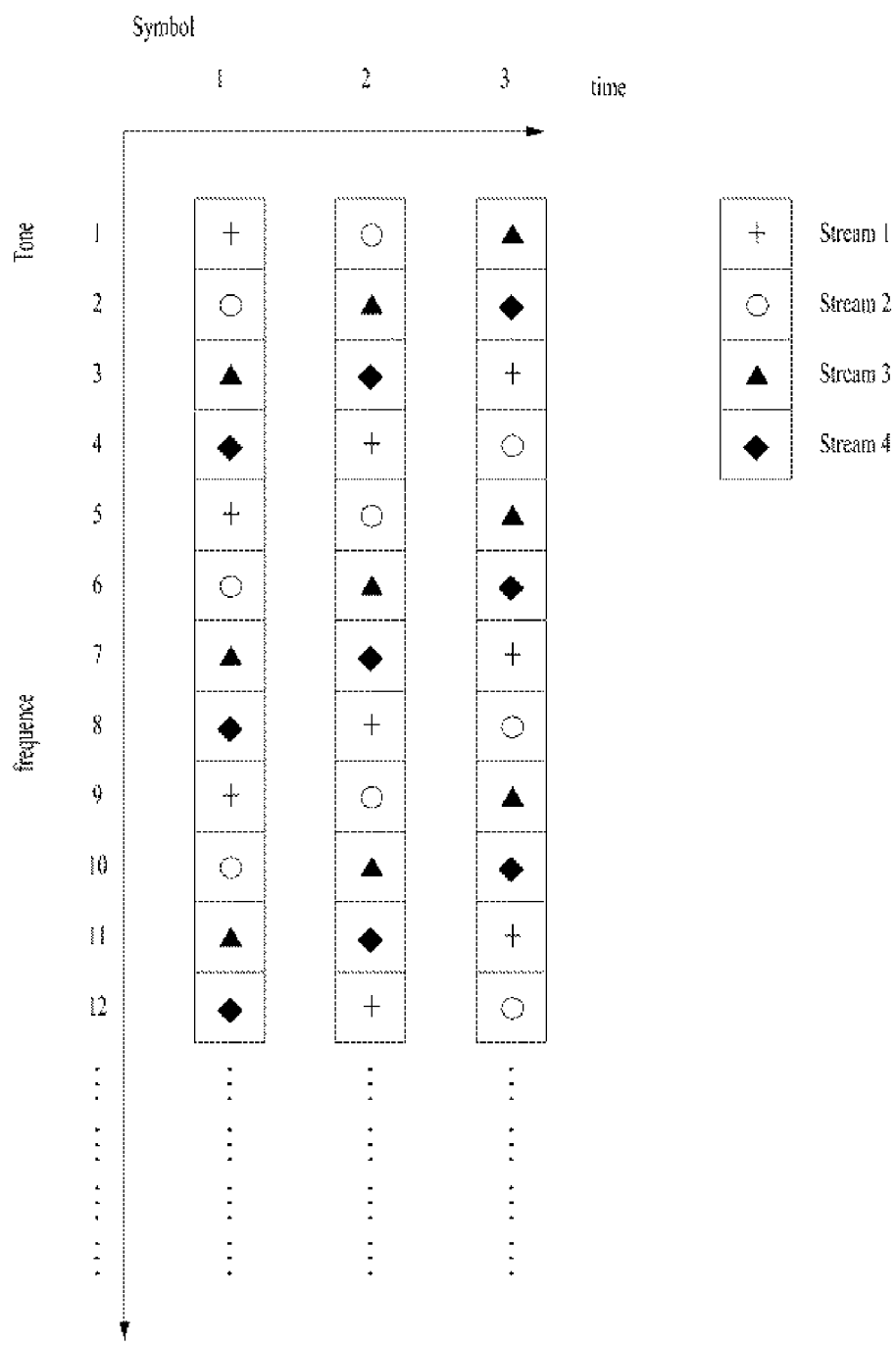
FIG. 11 is a diagram for explaining an available tone interleaving scheme according to an embodiment of the present invention.

FIG. 11 is a diagram for explaining an available tone interleaving scheme according to an embodiment of the present invention.

According to the tone interleaving scheme, a different tone location is used for a symbol per stream/user. In addition, an LTF sequence for the same user/stream is transmitted at an interval of a given tone spacing. Moreover, a tone location for transmitting the LTF sequence is changed at a certain interval depending on an LTF symbol.

For example, when four streams are transmitted through the 20 MHz bandwidth in the 11ax as shown in FIG. 11, an LTF sequence for each stream is loaded from a starting tone of a symbol in stream order, i.e., in order of s1, s2, s3, and s4. After an LTF sequence for the fourth stream is loaded, an LTF sequence for the first stream is loaded again in a next tone in the above order.

As described above, the LTF sequences for the individual streams are loaded in one symbol. Thereafter, in next LTF symbols, tone locations in the first symbol are sequentially shifted by 1, 2, 3, and 4 tones for LTF transmission.

Among the two schemes, the P-matrix based HT-LTF is unable to satisfy CFO (carrier frequency offset) sensitivity required when data is transmitted using the UL MU-MIMO. In addition, the tone interleaved HE-LTF has high complexity in that the HE-LTF needs to be defined in each RU size defined when data is transmitted using the OFDMA, and also has a problem in power boosting. Moreover, if both of the OFDMA and the UL-MU MIMO are simultaneously used for one PPDU, the HE-LTF needs to be differentiated for each user and each resource and thus, it is unable to use the same length of HE-LTFs.

Hence, a method for configuring and transmitting an HE-LTF to support the OFDMA and UL MU-MIMO is needed.

To solve the above problem, an embodiment of the present invention proposes that the OFDMA and UL MU-MIMO are not simultaneously used for a single PPDU and a different form of LTF is configured according to a multi-transmission method (e.g., OFDMA, UL MU-MIMO, etc.).

Figure 12:
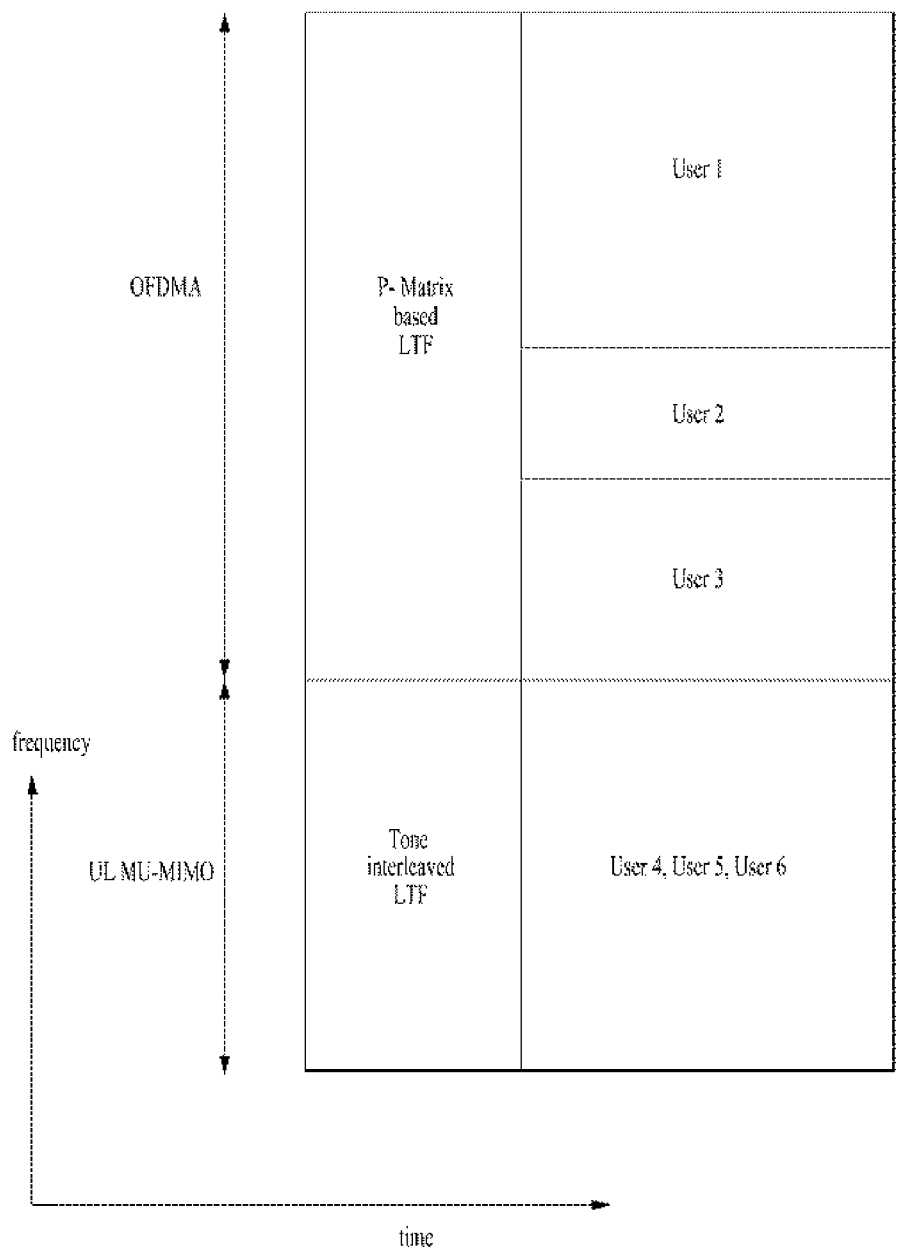
FIGS. 12 and 13 are diagrams for explaining examples in which a P-matrix based scheme and a tone interleaving scheme are used.
Figure 13:
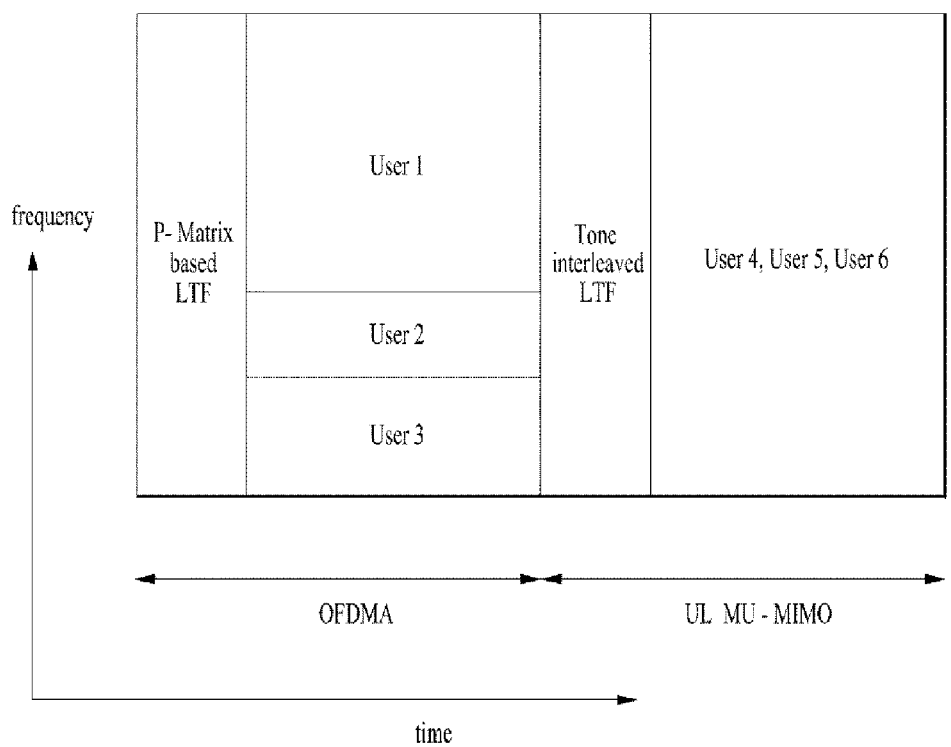

FIGS. 12 and 13 are diagrams for explaining examples in which a P-matrix based scheme and a tone interleaving scheme are used.

In the present embodiment, it is assumed that an AP/STA uses either the OFDMA or the UL MU-MIMO in a specific region (time/frequency) and uses a different HE-LTF configured for each multi-transmission method as shown in FIG. 12 or FIG. 13.

In the 11ax, the AP/STA may use a dual mode LTF scheme. Two types of LTF transmission and reception methods are defined in the dual mode LTF scheme. As representative examples, the P-matrix based scheme and the tone interleaved scheme are considered.

In the present invention, it is proposed to differently apply an LTF transmission scheme according to the multi-transmission method. The LTF transmission scheme in accordance with the multi-transmission method may be implicitly determined or notified through signaling (e.g., the HE-SIG, a trigger frame for UL MU, etc.). Meanwhile, the SIG B may also be divided into a common part and a UE-specific part in the 11ax system. In this case, it is preferred that the aforementioned information is included in the UE-specific part of the SIG B.

For example, when the AP/STA transmits data using the OFDMA, the AP/STA may configure and transmit the HE-LTF using the P-matrix based scheme. Information on the HE-LTF may be transmitted to the AP/STA through the HE-SIG. In addition, the HE-SIG includes information on an LTF mode, a compressed value (1×, 2×, 4×, etc.), a tone interval, etc. In this case, the compressed value means that the number of symbols used for LTF transmission is increased greater by one, two, or four times than that in the 1× symbol structure in order to reduce LTF overhead.

The information on the HE-LTF may be transmitted through the HE-SIG-A in the HE-SIG (i.e., HE-SIG-A and HE-SIG-B).

The aforementioned compressed value/tone interval of the LTF may be determined according to a CP length. For example, in case of a long CP length, compression may be reduced to use more tones for robust channel characteristics. (Alternatively, an interval of non-zero values may be reduced in the time domain or a symbol length may be increased.)

In addition, the aforementioned compressed value/tone interval of the LTF may be determined according to an MCS. For example, in case of a high MCS, compression may be increased.

Moreover, the aforementioned compressed value/tone interval of the LTF may be determined according to a packet length. For example, in case of a long packet length (e.g., 4×), compression may be reduced.

In general, the same CP length is applied to the same OFDMA symbol. However, the MCS and the packet length may be different in each transport block. Therefore, the present invention proposes a method of predetermining an LTF compression value according to an MCS, a packet length, and the like to configure the same LTF length regardless of transport blocks when the OFDMS is applied. This may be notified through signaling or determined implicitly. Further, when the LTF compression value is determined, a frequency resource size (e.g., the number of tone units) of an OFDMA block may be considered together.

The information on the HE-LTF may be determined by parameters such as TXVECTOR and RXVECTOR, which are transmitted and received for packet transmission. Such parameters include information on format, MCS, GI type, MU, and OFDMA and the LTF to be transmitted can be determined based on the information.

When the AP/STA transmits data using the UL MU-MIMO, the AP/STA may configure and transmit the HE-LTF using the tone interleaved scheme. This is because when the UL MU-MIMO is used, a CFO becomes more problematic because a signal needs to be allocated for each user.

In this case, information on the HE-LTF may be transmitted to the AP/STA through the HE-SIG. In addition, the HE-SIG includes information on an LTF mode, an interleaving value (e.g., 1×, 2×, 3×, 4×, etc.), a tone interval, a pattern index, etc. In this case, the tone interval means a distance between tones where LTF sequences for individual streams are loaded in a single symbol and the interleaving value means the number of tones shifted in each LTF symbol. For example, when the interleaving value is two, the second LTF symbol is created by shifting a tone location of the first LTF symbol by two tones. The pattern index means order of mapping LTF sequences to tones and a starting point and transmission location of a corresponding signal may be obtained based on the pattern index.

Similar to the P-matrix based transmission, the same CP length is applied to the same OFDMA symbol. However, an MCS and a packet length may be different in each MU-MIMO user or stream. However, in the case of the MU-MIMO, since it is unable to support different LTF lengths caused by change in the interleaving value and the like of the LTF per MCS and packet length, the same LTF length may be configured regardless of users or streams. Alternatively, by considering this, it is possible to configure the same MCS, packet length, and the like. Further, it is possible to configure a MU-MIMO set based on only combinations with the same LTF length after determining LTF lengths based on individual MCSs and packet lengths or any combination thereof.

The information on the HE-LTF may be determined by parameters such as TXVECTOR and RXVECTOR, which are transmitted and received for packet transmission. The parameters include information on format, MCS, GI type, MU, and OFDMA and the LTF to be transmitted can be determined based on the information.

In this embodiment, a case in which the OFDMA and the MU-MIMO are distinguished from each other by frequency at the same time is not excluded. In other words, they may coexist in the same PPDU. However, a case in which the OFDMA and the MU-MIMO do not coexist in the same PPDU, i.e., they are distinguished by time, may be advantageous not only in terms of complexity but also due to simple implementation of the HE-LTF.

When the OFDMA and the MU-MIMO coexist, HE-LTF lengths should be equal to each other. To this end, the method of mapping the LTF length for each MCS, packet length, etc., which is described for each of the OFDMA and the MU-MIMO, can be extensively applied in consideration of both of the OFDMA and the MU-MIMO.

Figure 14:
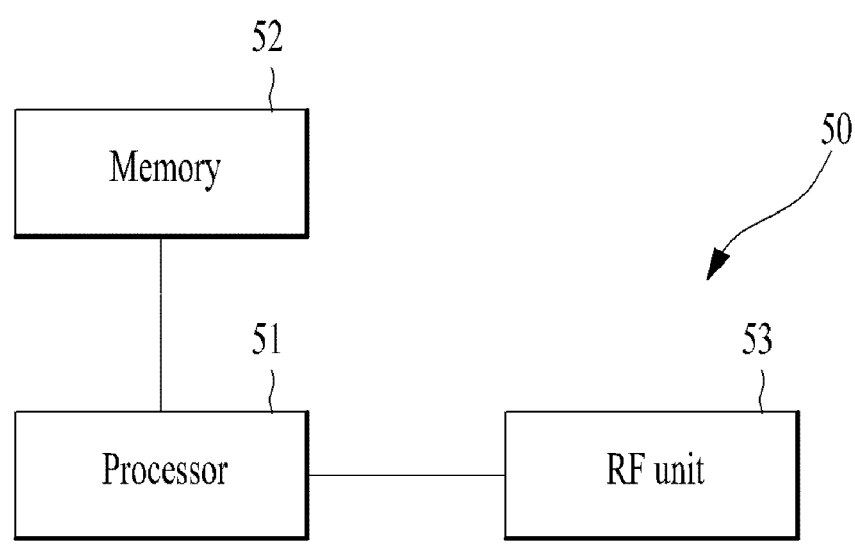
FIG. 14 is a diagram for explaining a station device for performing the above-mentioned methods.

FIG. 14 is a diagram for explaining a station device for performing the above-mentioned methods.

As shown in FIG. 14, the station device 50 may include a processor 51, a memory 52, and an RF unit 53. The processor 51 may use information stored in the memory 52 and control operations of the RF unit 53. In addition, the processor 51 may generate the aforementioned HE-LTF and then control a transmitter in the RF unit 53 to transmit the generated radio frame.

The station device 50 shown in FIG. 14 may be an AP or a non-AP STA.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the present invention is described on the assumption that the invention is applied to the WLAN system based on IEEE 802.11, the invention is not limited thereto. In addition, the present invention can be applied to various wireless systems in the same manner.

What is claimed is:

1. A method for transmitting a frame by a first station in a wireless local area network (WLAN) system, the method comprising:
generating a radio frame for a second type of station comprising a frame portion for a first type of station and a frame portion for the second type of station; and
wherein the frame portion for the second type of station comprises a signal field for the second type of station, a short training field (STF) for the second type of station, a long training field (LTF) for the second type of station, and a data field,
wherein the LTF for the second type of station has a symbol duration longer by two or four times than a symbol duration of the frame portion for the first type of station, and
wherein the signal field for the second type of station includes information on the symbol duration of the LTF for the second type of station,
transmitting, to a second station, the radio frame for the second type of station using a P-matrix based transmission scheme,
wherein according to the P-matrix based transmission scheme, a LTF sequence determined based on a transmission bandwidth is transmitted by using a P-matrix, and
wherein the P-matrix is one of the following matrices:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}, \text{ and}$$

$$P_{8\times 8} = \begin{bmatrix} P_{4\times 4} & P_{4\times 4} \\ P_{4\times 4} & -P_{4\times 4} \end{bmatrix},$$

where $w = \exp(-j2\pi/6)$.

2. The method of claim 1, wherein when the symbol duration of the LTF for the second type of station is double of the symbol duration of the frame portion for the first type of station, the LTF for the second type of station is generated by mapping an LTF sequence at an interval of two tones in a frequency domain.

3. The method of claim 1, wherein when the generated radio frame for the second type of station is transmitted using an uplink multi-user multi-input multi-output (UL MU-MIMO) scheme, the LTF for the second type of station is transmitted using a tone interleaving scheme.

4. The method of claim 3, wherein according to the tone interleaving scheme, LTF sequences for individual users or streams are transmitted such that the LTF sequences are mapped to different tone locations within a single symbol and an LTF sequence for the same user or stream is transmitted such that the LTF sequence is mapped at a predetermined tone interval.

5. The method of claim 4, wherein the signal field for the second type of station includes information regarding a scheme of mapping the LTF sequences for the individual users or streams.

6. The method of claim 1, wherein the first station is an access point (AP) or a non-AP station.

7. A station device operating as a first station in a wireless local area network (WLAN) system, the station device comprising:
a processor configured to generate a radio frame for a second type of station comprising a frame portion for a first type of station and a frame portion for the second type of station; and a transmitter configured to transmit the radio frame for the second type of station generated by the processor, wherein the frame portion for the second type of station comprises a signal field for the second type of station, a short training field (STF) for the second type of station, a long training field (LTF) for the second type of station, and a data field, wherein the LTF for the second type of station has a symbol duration longer by two or four times than a symbol duration of the frame portion for the first type of station, wherein the signal field for the second type of station includes information on the symbol duration of the LTF for the second type of station, wherein the processor is further configured to transmit the LTF for the second type of station using a P-matrix based transmission scheme, wherein according to the P-matrix based transmission scheme, a LTF sequence determined based on a transmission bandwidth is transmitted by using a P-matrix, and wherein the P-matrix is one of the following matrices:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}, \text{ and}$$

$$P_{8\times 8} = \begin{bmatrix} P_{4\times 4} & P_{4\times 4} \\ P_{4\times 4} & -P_{4\times 4} \end{bmatrix},$$

where $w = \exp(-j2\pi/6)$.

where $W=\exp(-j2\pi/6)$.

8. The station device of claim 7, wherein when the symbol duration of the LTF for the second type of station is double of the symbol duration of the frame portion for the first type of station, the LTF for the second type of station is generated by mapping an LTF sequence at an interval of two tones in a frequency domain.

9. The station device of claim 7, wherein when the generated radio frame for the second type of station is transmitted using an uplink multi-user multi-input multi-output (UL MU-MIMO) scheme, the processor is configured to transmit the LTF for the second type of station using a tone interleaving scheme.

10. The station device of claim 9, wherein according to the tone interleaving scheme, LTF sequences for individual users or streams are transmitted such that the LTF sequences are mapped to different tone locations within a single symbol and an LTF sequence for the same user or stream is transmitted such that the LTF sequence is mapped at a predetermined tone interval.

11. The station device of claim 10, wherein the signal field for the second type of station includes information regarding a scheme of mapping the LTF sequences for the individual users or streams.

* * * * *